(12) United States Patent
Meisner

(10) Patent No.: US 11,087,097 B2
(45) Date of Patent: Aug. 10, 2021

(54) AUTOMATIC ITEM GENERATION FOR PASSAGE-BASED ASSESSMENT

(71) Applicant: ACT, INC., Iowa City, IA (US)

(72) Inventor: Richard D. Meisner, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 8 days.

(21) Appl. No.: 15/823,548

(22) Filed: Nov. 27, 2017

(65) Prior Publication Data

US 2019/0163746 A1     May 30, 2019

(51) Int. Cl.
| | |
|---|---|
| *G06F 40/58* | (2020.01) |
| *G09B 7/02* | (2006.01) |
| *G06F 40/131* | (2020.01) |
| *G06F 40/151* | (2020.01) |
| *G06F 40/268* | (2020.01) |
| *G06F 40/284* | (2020.01) |
| *G06F 40/289* | (2020.01) |

(52) U.S. Cl.
CPC ............ *G06F 40/58* (2020.01); *G06F 40/131* (2020.01); *G06F 40/151* (2020.01); *G06F 40/268* (2020.01); *G06F 40/284* (2020.01); *G06F 40/289* (2020.01); *G09B 7/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,060,155 | A | * 10/1991 | van Zuijlen | G06F 17/2705 704/9 |
| 6,076,051 | A | * 6/2000 | Messerly | G06F 16/3344 704/9 |
| 6,098,034 | A | * 8/2000 | Razin | G06F 17/22 704/9 |
| 6,393,253 | B1 | * 5/2002 | Kitabatake | G09B 7/02 380/251 |
| 6,629,087 | B1 | * 9/2003 | Benson | G06F 17/24 704/2 |
| 7,033,182 | B1 | * 4/2006 | Anand | G09B 7/08 434/118 |
| 7,286,793 | B1 | * 10/2007 | Miele | G09B 7/00 434/323 |
| 8,108,391 | B1 | * 1/2012 | Yang | G06F 17/2775 707/736 |
| 8,202,097 | B1 | 6/2012 | Brittingham | |
| 9,454,584 | B1 | 9/2016 | Ostler | |
| 9,847,039 | B2 | * 12/2017 | Guo | G09B 7/00 |

(Continued)

*Primary Examiner* — Abdelali Serrou
(74) *Attorney, Agent, or Firm* — Sheppard, Mullin, Richter & Hampton LLP

(57) ABSTRACT

A computer-implemented method for automatic item generation in an digital examination that includes obtaining a first string of text, the first string of text being organized based on a linguistic context, selecting a first textual term from the first string of text, identifying a first set of linguistic characteristics corresponding to the first textual term, obtaining a second textual term exhibiting at least one linguistic characteristic that is different from any linguistic characteristic of the first set of linguistic characteristics, and generating a second string of text by replacing the first textual term in the first string of text with the second textual term.

20 Claims, 4 Drawing Sheets

(56) References Cited

U.S. PATENT DOCUMENTS

| | | | |
|---|---|---|---|
| 2003/0055623 A1* | 3/2003 | Epstein | G06F 17/2775 704/1 |
| 2003/0149692 A1* | 8/2003 | Mitchell | G06F 16/3344 |
| 2004/0175687 A1* | 9/2004 | Burstein | G06F 40/20 434/353 |
| 2004/0234936 A1* | 11/2004 | Ullman | G09B 7/02 434/322 |
| 2004/0259062 A1* | 12/2004 | Heller | G09B 7/077 434/236 |
| 2005/0049852 A1* | 3/2005 | Chao | G06F 17/277 704/9 |
| 2008/0026360 A1* | 1/2008 | Hull | G09B 7/00 434/324 |
| 2009/0123902 A1* | 5/2009 | Higgs | G09B 7/00 434/323 |
| 2011/0184725 A1* | 7/2011 | Connor | G06F 17/2775 704/9 |
| 2012/0045744 A1* | 2/2012 | Nickolai | G09B 7/00 434/322 |
| 2013/0196305 A1* | 8/2013 | Adir | G09B 29/00 434/322 |
| 2013/0203037 A1* | 8/2013 | Ramaswamy | G06Q 50/20 434/353 |
| 2014/0214385 A1 | 7/2014 | Gierl | |
| 2015/0006170 A1* | 1/2015 | Caskey | G10L 25/48 704/235 |
| 2015/0199400 A1* | 7/2015 | Wu | G06F 40/211 434/353 |
| 2015/0261849 A1* | 9/2015 | Chu-Carroll | G06F 16/3329 707/723 |
| 2016/0048772 A1* | 2/2016 | Bruno | G06N 5/04 706/11 |
| 2016/0170972 A1* | 6/2016 | Andrejko | G06F 17/2735 704/9 |
| 2017/0017642 A1* | 1/2017 | Cunningham | G06F 17/289 |
| 2017/0213469 A1* | 7/2017 | Elchik | G06F 40/186 |
| 2017/0371861 A1* | 12/2017 | Barborak | G06F 17/271 |
| 2018/0130465 A1* | 5/2018 | Kim | G10L 15/22 |
| 2019/0130073 A1* | 5/2019 | Sun | G06F 17/2785 |

\* cited by examiner

AUTOMATIC ITEM GENERATION FOR PASSAGE-BASED ASSESSMENT

TECHNICAL FIELD

The disclosed technology relates generally to digital testing, and more particularly various embodiments relate to systems and methods for automatic item generation for passage-based assessment.

BACKGROUND

A traditional testing method for both language and mathematics includes insertion of an error state into an otherwise correct statement, and a request to the examinee to identify the error condition and/or correct the error conditions. For example, a math problem may include an incorrect operator or answer, and the examinee may be asked to select the correct operator or answer from a list of possibilities. Similarly, a language examination may present an examinee with a sentence including a verb in an incorrect tense, and the examinee may be asked to select the verb in the correct tense from a list of possibilities. Existing digital examination creation tools are capable of generating an error condition in the mathematical examination, but not in the language examination. Traditional automated language examination creation methods are inflexible with respect to the ability to create multiple forms of a particular linguistic examination in real-time that are comprehensive with respect to breadth of items created from a given passage and potential errors.

BRIEF SUMMARY OF EMBODIMENTS

An automatic item generation system and method for the assessment of language proficiency obtains a passage of text as input and uses various Natural Language Processing methods to scan the passage, selectively introduce various types of language errors into the passage, based on specific linguistic patterns found in the passage, underline and number the introduced errors, and generate corresponding numbered multiple choice items for which one of the answer options is the correction of the underlined error.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
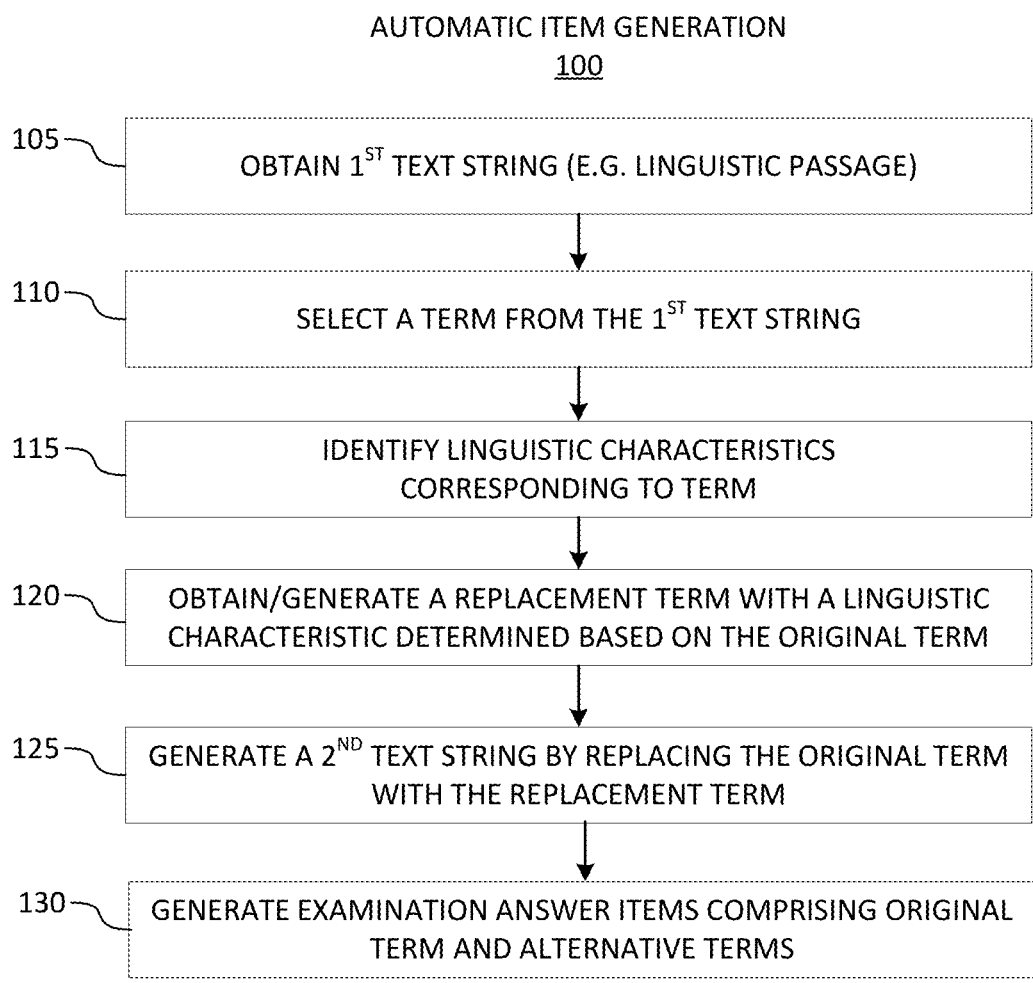
FIG. 1 is a flowchart illustrating an example method for automatic item generation for passage-based assessment, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward a system and method for automatically generating items for a linguistic assessment (e.g., an written examination whereby linguistic passages are presented with incorrect terms inserted, and an examinee is asked to replace the incorrect term with a correct term.

Some embodiments of the disclosure provide a computer implemented method of item generation in an digital examination. The method may include obtaining a first string of text (e.g., a textual passage), wherein the first string of text is organized based on a linguistic context. The method may further include selecting a first textual term from the first string of text, identifying a first set of linguistic characteristics corresponding to the first textual term, and obtaining a second textual term (e.g., an error to be inserted into the passage) exhibiting at least one linguistic characteristic that is different from any linguistic characteristic of the first set of linguistic characteristics. In some examples, the method includes generating a second string of text by replacing the first textual term in the first string of text with the second textual term.

In some embodiments, identifying the linguistic characteristics corresponding to the first textual term includes tokenizing the first string of text into separate words, identifying a part-of-speech for each separate word, and determining phrase types corresponding to groups of separate words based on matching the groups of separate words to part-of-speech patterns from a linguistic model.

Some examples of the method include selecting the linguistic characteristics of the first set of linguistic characteristics from linguistic characteristic categories. For example, the linguistic characteristic categories may include punctuation, word types, parts of speech, verb tenses, or types of phrases. The method may include generating a set of examination answers comprising the first textual term and alternate textual terms. The linguistic characteristic of the second textual term is selected from a same linguistic characteristic category as the first textual term. The method may also include selecting alternate textual terms from a set of linguistic terms exhibiting linguistic characteristics selected from a same linguistic characteristic category as the first textual term.

Some embodiments may include generating a first linguistic pattern for the first string of text by identifying a linguistic characteristic tag for each respective textual term in the string of text and storing the linguistic characteristic tag in a data store. For example, the linguistic characteristic tag may include an order index relative to a location of a respective textual term in the first string of text and a linguistic characteristic category corresponding to the respective textual term. In some examples, the first linguistic pattern matches a second linguistic pattern corresponding to the second string of text. In some examples, the second string of text is linguistically incorrect. The second string of text may be displayed on graphical user interface, e.g., to enable an examinee to take the exam. Similarly, the set of examination answers may be displayed on a graphical user interface and an input may be obtained from the graphical user interface, the input indicating one of the set of examination answers.

Some embodiments of the disclosure provide a system for generating items in an digital examination. For example, the system may include a data store, a graphical user interface, and an item generation logical circuit. The item generation logical circuit may include a processor and a non-transitory memory with computer executable instructions embedded thereon. The computer executable instructions configured to cause the processor to obtain a first string of text, wherein the first string of text is organized based on a linguistic context. The computer executable instructions may also cause the processor to select a specified type of first textual term from the first string of text, identify a first set of linguistic characteristics corresponding to the specified type of first textual term, obtain a second textual term exhibiting at least one linguistic characteristic that is different from any linguistic characteristic of the first set of linguistic characteristics, and generate a second string of text by replacing the first textual term in the first string of text with the second textual term.

In some examples, the computer executable instructions cause the processor to tokenize the first string of text into separate words, identify a part-of-speech for each separate word, and determine phrase types corresponding to groups of separate words based on matching the groups of separate words to part-of-speech patterns from a linguistic model. The system may also select the linguistic characteristics of the first set of linguistic characteristics from linguistic characteristic categories. For example, the linguistic characteristic categories may comprise punctuation, word types, parts of speech, verb tenses, or types of phrases. The system may generate a set of examination answers including the first textual term and alternate textual terms. In some examples, at least one linguistic characteristic of the second textual term is selected from a same linguistic characteristic category as the first textual term. The system may select the alternate textual terms from a set of linguistic terms exhibiting linguistic characteristics selected from a same linguistic characteristic category as the first textual term.

In some examples, the system generates a first linguistic pattern for the first string of text by identifying a linguistic characteristic tag for each respective textual term in the string of text, and stores the linguistic characteristic tag in the data store. The linguistic characteristic tag may include an order index relative to a location of a respective textual term in the first string of text and a linguistic characteristic category corresponding to the respective textual term.

FIG. 1 illustrates an example method for automatic item generation for passage-based assessment. Referring to FIG. 1, a method for automatic item generation may include obtaining a first text string at step 105 and selecting a term from the first text string at step 110. For example, a text string may be a linguistic passage, such as a sentence or paragraph from a piece of literature, article, book, website, or other literary source. In some examples, a text string may be obtained from a user interface, a data store, or a remote data source. The text string may be a passage with a literary theme or context. A series of text strings may be used to create a series of questions, for example, as part of a reading comprehension, grammar, literature, writing, or other type of examination.

The term selected from the text string at step 110 may be a single word or a series of words in a phrase, of a type specified by an item model. The textual term may include punctuation. A goal of the automatic item generation method is to replace the selected term with an incorrect term that is close enough in linguistic context and/or grammar to the original term to challenge an examinee to identify and correct the error inserted in the text string. The method may include tagging and/or replacing a single term or multiple terms to create multiple items based on the passage. An examinee may be presented with the incorrect text string through a graphical user interface. The examinee may be scored/graded based on the examinee's ability to accurately identify the correct term replacement.

The method for automatic item generation 100 may also include identifying linguistic characteristics corresponding to the term at step 115. For example, linguistic characteristics may include types and positions of punctuation, types of words (e.g. logical connectors), parts of speech (e.g. plural noun, adverb), verb tenses, types of phrases (e.g. prepositional, infinitive), and specific combinations of the above.

In some examples, method 100 may include obtaining a replacement term with a linguistic characteristic determined based on the original term at step 120. For example, the linguistic characteristic of the replacement term may be selected from, or generated to correspond to, the same category of linguistic characteristics as the original term. For example, both linguistic characteristics may be parts-of-speech. In some embodiments, the linguistic characteristic of the replacement term may be the same as the linguistic characteristic of the original term. For example, both linguistic characteristics may be nouns. In other embodiments, the linguistic characteristic of the replacement term may be different than the linguistic characteristic of the original term. For example, the replacement linguistic characteristic may be selected to be a verb when the original linguistic characteristic is a noun. The replacement term may be selected using methods disclosed herein. In some examples, the replacement term may be obtained from a datastore or a remote network or database.

Method 100 may also include generating an alternate text string by replacing the original term in the original text string with the replacement term at step 125. The alternate text string may be presented to the examinee, for example, through a graphical user interface. The replacement text string may be grammatically or linguistically incorrect when inserted in the original text string. In some examples, the replacement term is selected from a pool of replacement terms stored in a database on the datastore. The replacement terms in the pool of replacement terms may be tagged and/or indexed based on linguistic characteristics to enable selection of a particular replacement term possessing desired linguistic characteristics. The method may alternatively include generating a replacement term by manipulating linguistic components in a variety of characteristic ways, including insertions, deletions, replacement, displacements, or transpositions. In some examples, the pool of replacement terms may be generated manually or through a learning algorithm applied to a corpus of literary passages, e.g., using a machine learning process.

In some examples, the pool of replacement terms is specified by analyzing a large number of existing operational items to determine and tag characteristic linguistic patterns, including based on specific taxonomy codes. Some example item models for generating a passage-based literary proficiency assessment examination may make use of such patterns by specifying a linguistic pattern in the passage, an error to introduce and underline in the passage, and a pattern of the answer options corresponding to the underlined portion.

An item model generated using this method may avoid generating items that are too easy by focusing on plausible, commonly-made errors. One way to achieve this is by abstracting the model from a parent item known to perform well in operational assessment. For example, method 100 may include assessing subject-verb agreement, followed by the specification of a corresponding item model abstracted from the item, which can be used to automatically generate similar items from any new passage found to have the corresponding linguistic pattern. An example relevant portion of an original passage may read: "Cather's will prohibits publication of her correspondence. Therefore, reading one of her letters involves traveling to a Cather archive."

An error may be introduced and underlined by replacing the term "involves" with the incorrect term "involve". Notably, in this example, the linguistic category (i.e., tense) is the same for both the original term and the incorrect term, but the linguistic characteristic (i.e., plural vs. singular) is different between the two terms. The example passage is changed to: " . . . . Therefore, reading one of her letters involve traveling to a Cather archive." The method may generate a set of answers in this example: (A) NO CHANGE; (B) have involved; (C) involves; and (D) are involving. The correct answer is C in the example, and alternate incorrect answers are generated to increase the challenge of the question.

In this example, the item model is abstracted from the above item. For example, the linguistic pattern in the original passage may be analyzed by tokenizing the original text string and tagging individual terms based on linguistic characteristics. The linguistic patterns may then be identified in the original passage, and the alternate passage may be generated by identifying and inserting a replacement term in the passage that preserves the same linguistic pattern. For example, the linguistic pattern may look like: [plural noun] [verb ending in "s"]. In this example, an error may be introduced and underlined as a [verb ending in "s"] and replaced by [same verb no longer ending in "s"]. The answers options may be generated as follows: (A) NO CHANGE; (B) have [verb in past tense]; C. [verb ending in "s"]; and (D) are [verb ending in "ing"]. The abstracted question and answer model may be applied to the same or other original passages to create a large number of questions and answers.

In some embodiments, method 100 includes generating answers for an examinee to select from, which include the original term at step 130. The answers may be presented to the examinee through a graphical user interface together with the alternate text string. Because the system may select different replacement terms for a given text string at random or based on a selection algorithm, a large variety of possible distinct alternate text strings may be generated, as to generate a large number of mutually distinct examinations. Similarly, a variety of potential examination responses may be included in a pool of examination responses, together with the original term (i.e., the correct answer), to create a large variety of distinct answer sets to the same examination question text string. As such, the method may produce a large number of mutually distinct examinations for the same set of original text strings.

Figure 2:
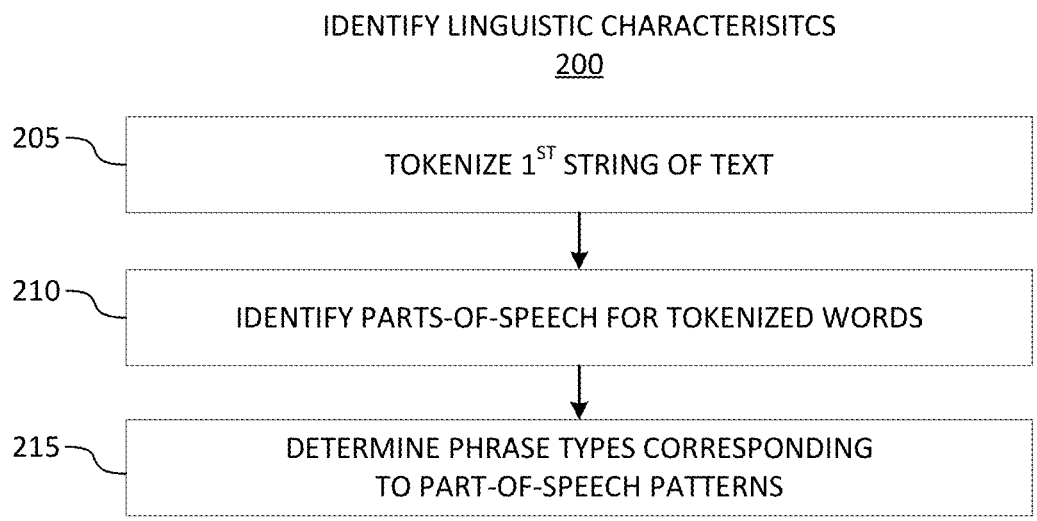
FIG. 2 is a flowchart illustrates an example method of identifying linguistic characteristics, consistent with embodiments disclosed herein.

FIG. 2 is a flowchart illustrates an example method of identifying linguistic characteristics. As illustrated, a method for identifying linguistic characteristics may include tokenizing a first string of text at step 205 and identifying parts-of-speech for the tokenized words at step 210. Tokenizing a text string may include separating the text string into multiple granular sub-parts, for example, individual words or groups of words. The granular sub-parts may be stored in a database on a datastore and assigned one or more parameters describing the granular sub-part. For example, the granular sub-parts may include a passage index to identify the location of the granular sub-part from the original text string, as well as one or more labels or tags indicating additional information about the granular sub-part.

Still referring to FIG. 2, method of identifying linguistic characteristics 200 may include identifying parts-of-speech for the tokenized words (i.e., the tokenized words) at step 210. The parts-of-speech may be determined by comparing the tokenized word to a part-of-speech database, for example, as stored on a local datastore or extracted from a remote datastore or network. The tokenized words may also be analyzed and tagged with other descriptive characteristics such as tense, punctuation, contextual cues, or other linguistically relevant information. Method 200 may also include determining phrase types corresponding to part-of-speech patterns based on the tokenized words.

For example, a linguistic pattern analyzer may be trained on a linguistic training set to identify recurring patterns. The training may be manual, or include a machine learning algorithm. The linguistic training set may include a set of manually created passages, such as other literary examinations. The linguistic training set may include one or more linguistic corpuses obtained from a local datastore or a remote datastore or network. The linguistic training set may be tokenized and tagged with descriptive characteristics, similar to the tokenization of the text string. The linguistic pattern analyzer may then be trained by identifying multiple recurring linguistic patterns in the training set.

In some embodiments, the linguistic pattern analyzer may obtain tokenized words and corresponding descriptive parameters for a given text string and identify linguistic patterns in the tokenized words. The linguistic patterns may correspond to phrases or logically connected groups of words based on their context and descriptive characteristics. The tokenized words may be tagged with indicators identifying the tokenized word's association to one or more linguistic patterns, and that tag may be used to select or generate a contextually appropriate replacement term.

Figure 3:
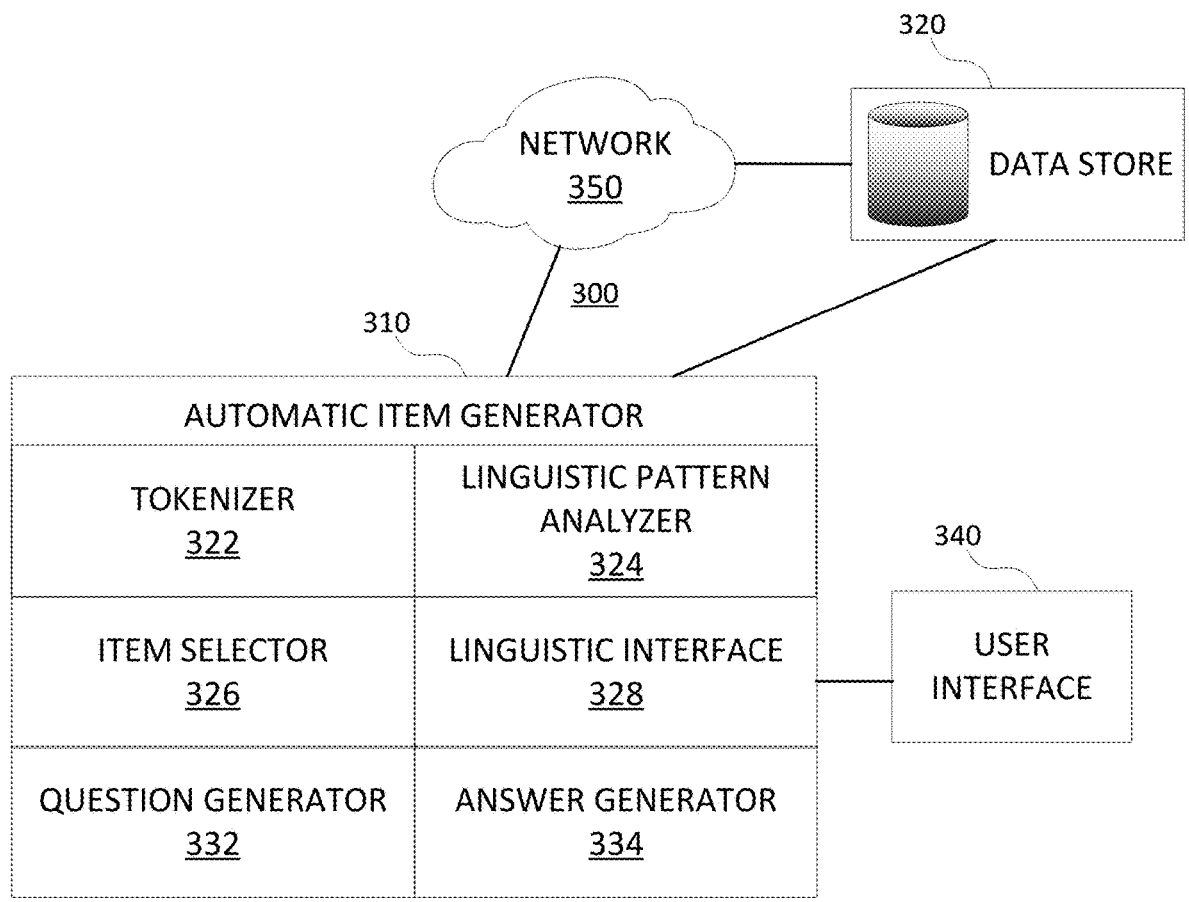
FIG. 3 illustrates a schematic diagram of an example system for automatic item generation for passage-based assessment, consistent with embodiments disclosed herein.

FIG. 3 illustrates a schematic diagram of an example system for automatic item generation for passage-based assessment 300. System 300 may include an automatic item generator 310. For example, automatic item generator 310 may be a computer server, workstation, network of computers, laptop, mobile device, logical circuit, or other computer device. In some embodiments, automatic item generator 310 may include a tokenizer 322. Tokenizer 322 may be a logical circuit, e.g., including a processor and a non-volatile memory with computer executable instructions embedded thereon. The computer executable instructions may be configured to cause the processor to tokenize a text string or a linguistic training set, for example, as described above with respect to FIGS. 1 and 2.

Automatic item generator 310 may include linguistic pattern analyzer 324. Linguistic pattern analyzer 324 may be a logical circuit configured to obtain linguistic data and identify patterns therein. For example, the linguistic data may include tokenized words from a linguistic training set or a text string as described above with respect to FIGS. 1 and 2.

Automatic item generator 310 may also include item selector 326. Item selector 326 may obtain tokenized words from a text string together with corresponding linguistic characteristics and pattern information to identify a related alternate tokenized word or group of tokenized words based on matching or similar linguistic characteristics and pattern information, as described above with respect to FIGS. 1 and 2. For example, item selector 326 may obtain an original term from a linguistic passage and identify an alternate term (e.g., an incorrect term) based on the linguistic characteristics of both the original term and the alternate term.

In some embodiments, automatic item generator 310 may include linguistic interface 328. Linguistic interface 328 may be a logical circuit configured to communicatively couple automatic item generator 310 to a network 350, datastore 320, and/or user interface 340. In some examples, automatic item generator 310 may include question generator 332 and/or answer generator 334. For example, question generator 332 and answer generator 334 may be logical circuits. Question generator 332 may be configured to obtain a text string, identified original term, and identified replacement term. Question generator 332 may replace the original term with the replacement term to generate an alternate text string which is linguistically incorrect. Answer generator 334 may obtain a set of incorrect answer terms, based on their linguistic characteristics as compared to the linguistic characteristics of the original term. The full answer set may include the set of incorrect answer terms and the original term. Automatic item generator 310 may generate a linguistic examination with multiple questions and answers. Automatic item generator 310 may be communicatively coupled to data store 320 and/or user interface 340 as to store the examination, or one or more examination sub-parts, in data store 320 or present the examination to an examinee on user interface 340.

Figure 4:
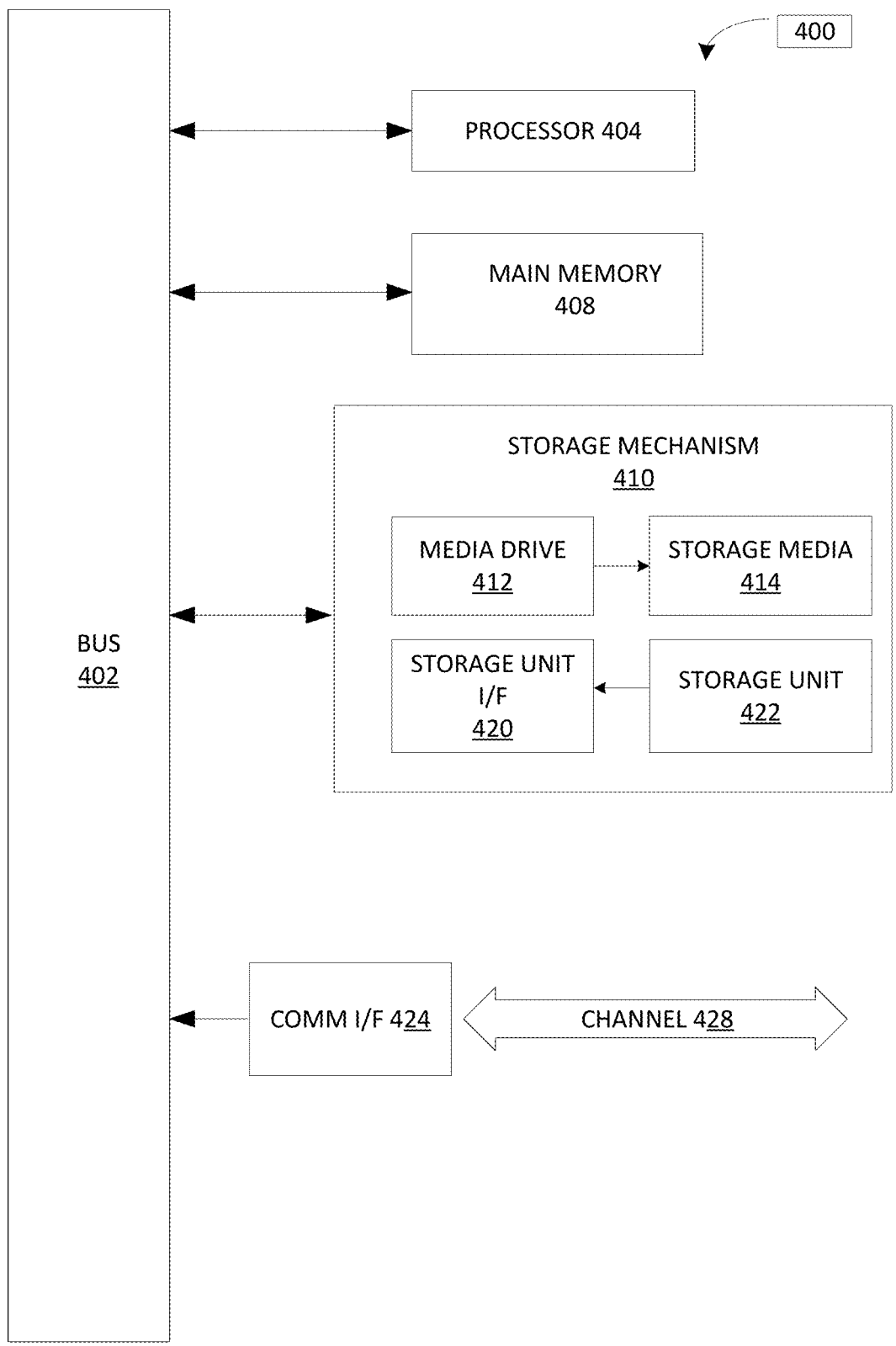
FIG. 4 illustrates an example computing system that may be used in implementing various features of embodiments of the disclosed technology.

As used herein, the terms logical circuit and engine might describe a given unit of functionality that can be performed in accordance with one or more embodiments of the technology disclosed herein. As used herein, either a logical circuit or an engine might be implemented utilizing any form of hardware, software, or a combination thereof. For example, one or more processors, controllers, ASICs, PLAs, PALs, CPLDs, FPGAs, logical components, software routines or other mechanisms might be implemented to make up a engine. In implementation, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 4. Various embodiments are described in terms of this example logical circuit 400. After reading this description, it will become apparent to a person skilled in the relevant art how to implement the technology using other logical circuits or architectures.

Referring now to FIG. 4, computing system 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Logical circuit 400 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 400 might include, for example, one or more processors, controllers, control engines, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of logical circuit 400 or to communicate externally.

Computing system 400 might also include one or more memory engines, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Logical circuit 400 might likewise include a read only memory ("ROM") or other static storage device coupled to bus 402 for storing static information and instructions for processor 404.

The computing system 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 140 might include other similar instrumentalities for allowing computer programs or other instructions or data to be loaded into logical circuit 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory engine) and memory slot, a PCMCIA slot and card, and other fixed or removable storage units 422 and interfaces 420 that allow software and data to be transferred from the storage unit 422 to logical circuit 400.

Logical circuit 400 might also include a communications interface 424. Communications interface 424 might be used to allow software and data to be transferred between logical circuit 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 400 to perform features or functions of the disclosed technology as discussed herein.

Although FIG. 4 depicts a computer network, it is understood that the disclosure is not limited to operation with a computer network, but rather, the disclosure may be practiced in any suitable electronic device. Accordingly, the computer network depicted in FIG. 4 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

I claim:

1. A computer implemented method of passage-based automated item generation in a digital examination, the method comprising:

obtaining a first string of text, the first string of text being organized based on a linguistic context;

selecting a first textual term from the first string of text;

identifying a first set of linguistic characteristics corresponding to the first textual term by:
  tokenizing the first string of text into separate words;
  identifying a part-of-speech for each separate word; and
  determining, with a machine learning-based linguistic pattern analyzer, phrase types corresponding to groups of separate words based on matching the groups of separate words to part-of-speech patterns;
obtaining a second textual term exhibiting at least one linguistic characteristic, wherein:
  the at least one linguistic characteristic is different from any linguistic characteristic of the first set of linguistic characteristics corresponding to the first textual term,
  the at least one linguistic characteristic is chosen from a list including a type of punctuation, a logical connector, a noun, an adverb, a verb, a tense, a prepositional phrase, and an infinitive phrase, and
  automatically replacing the first textual term with the second textual term creates a grammatically or linguistically incorrect term in the first string of text that is absent when the first textual term is used in the first string of text, wherein the automatic replacement of the first textual term with the second textual term is not performed by a human;
generating a second string of text by replacing the first textual term in the first string of text with the second textual term, wherein the second textual term includes the at least one linguistic characteristic that is different from any linguistic characteristic of the first set of linguistic characteristics; and
generating a set of examination answers comprising the first textual term, second textual term, and other alternate textual terms;
wherein determining phrase types corresponding to the groups of separate words comprises:
  training the machine learning-based linguistic pattern analyzer by:
    obtaining training passages;
    tokenizing the training passages into corresponding training words;
    determining, with the machine learning-based linguistic pattern analyzer, training part-of-speech patterns corresponding to the training passages, and identifying multiple recurring linguistic patterns in the training passages; and
    applying the machine learning-based linguistic pattern analyzer to the first string of text.

2. The method of claim 1, wherein the at least one linguistic characteristic of the second textual term is selected from a same linguistic characteristic category as the first textual term.

3. The method of claim 1, further comprising selecting the alternate textual terms from a set of linguistic terms exhibiting linguistic characteristics selected from a same linguistic characteristic category as the first textual term.

4. The method of claim 1, further comprising generating a first linguistic pattern for the first string of text, the generating the first linguistic pattern comprising identifying a linguistic characteristic tag for each respective textual term in the first string of text and storing the linguistic characteristic tag in a data store.

5. The method of claim 4, wherein the linguistic characteristic tag comprises an order index relative to a location of a respective textual term in the first string of text and a linguistic characteristic category corresponding to the respective textual term.

6. The method of claim 5, wherein the first linguistic pattern matches a second linguistic pattern corresponding to the second string of text.

7. The method of claim 1, wherein the second string of text is linguistically incorrect.

8. The method of claim 1, further comprising displaying the second string of text on a graphical user interface.

9. The method of claim 1, further comprising displaying the set of examination answers on a graphical user interface and obtaining an input from the graphical user interface, the input indicating one of the set of examination answers.

10. A system for generating items in a digital examination, the system comprising:
  a data store, a graphical user interface, a machine learning-based linguistic pattern analyzer, and an item generation logical circuit, wherein the item generation logical circuit comprises a processor and a non-transitory memory with computer executable instructions embedded thereon, the computer executable instructions configured to cause the processor to:
  obtain training passages;
  tokenize the training passages into corresponding training words;
  determine, with the machine learning-based linguistic pattern analyzer, training part-of-speech patterns corresponding to the training passages, and identify multiple recurring linguistic patterns in the training passages;
  train the machine learning-based linguistic pattern analyzer based on input from the graphical user interface identifying training phrase types corresponding to groups of training words, training part-of-speech patterns, and indications that the machine learning-based linguistic pattern analyzer correctly determined the training part-of speech patterns;
  obtain a first string of text, the first string of text being organized based on a linguistic context;
  select a first textual term from the first string of text;
  tokenize the first string of text into separate words;
  identify a part-of-speech for each separate word;
  determine, with the machine learning-based linguistic pattern analyzer, phrase types corresponding to groups of separate words based on matching the groups of separate words to part-of-speech patterns;
  obtain a second textual term exhibiting at least one linguistic characteristic, wherein:
    the at least one linguistic characteristic is different from any linguistic characteristic of a first set of linguistic characteristics corresponding to the first textual term,
    the at least one linguistic characteristic is chosen from a list including a type of punctuation, a logical connector, a noun, an adverb, a verb, a tense, a prepositional phrase, and an infinitive phrase, and
    automatically replacing the first textual term with the second textual term creates a grammatically or linguistically incorrect term in the first string of text that is absent when the first textual term is used in the first string of text, wherein the automatic replacement of the first textual term with the second textual term is not performed by a human;
  generate a second string of text by replacing the first textual term in the first string of text with the second textual term, wherein the second textual term includes the at least one linguistic characteristic that is different from any linguistic characteristic of the first set of linguistic characteristics; and generate a set of examination answers comprising the first textual term, second textual term, and other alternate textual terms.

11. The system of claim 10, wherein the at least one linguistic characteristic of the second textual term is selected from a same linguistic characteristic category as the first textual term.

12. The system of claim 10, wherein the computer executable instructions are further configured to cause the processor to select the alternate textual terms from a set of linguistic terms exhibiting linguistic characteristics selected from a same linguistic characteristic category as the first textual term.

13. The system of claim 10, wherein the computer executable instructions are further configured to cause the processor to generate a first linguistic pattern for the first string of text by identifying a linguistic characteristic tag for each respective textual term in the first string of text, and store the linguistic characteristic tag in the data store.

14. The system of claim 13, wherein the linguistic characteristic tag comprises an order index relative to a location of a respective textual term in the first string of text and a linguistic characteristic category corresponding to the respective textual term.

15. The system of claim 14, wherein the first linguistic pattern matches a second linguistic pattern corresponding to the second string of text.

16. The system of claim 10, wherein the second string of text is linguistically incorrect.

17. The system of claim 10, wherein the computer executable instructions are further configured to cause the processor to display the second string of text on the graphical user interface.

18. The system of claim 10, wherein the computer executable instructions are further configured to cause the processor to display the set of examination answers on the graphical user interface and obtain a second input from the graphical user interface, the second input indicating one of the set of examination answers.

19. The method of claim 1, further comprising:

generating the digital examination as a linguistic examination with multiple questions and a set of answers, wherein the set of answers includes at least the first textual term and the second textual term; and enabling to present the digital examination to an examinee on a second graphical user interface.

20. The method of claim 1, wherein the incorrect term increases difficulty of the digital examination.

* * * * *